June 23, 1959     H. J. MOXNESS     2,891,843
CHEMICAL RECOVERY PROCESS AND APPARATUS
Filed Feb. 9, 1953
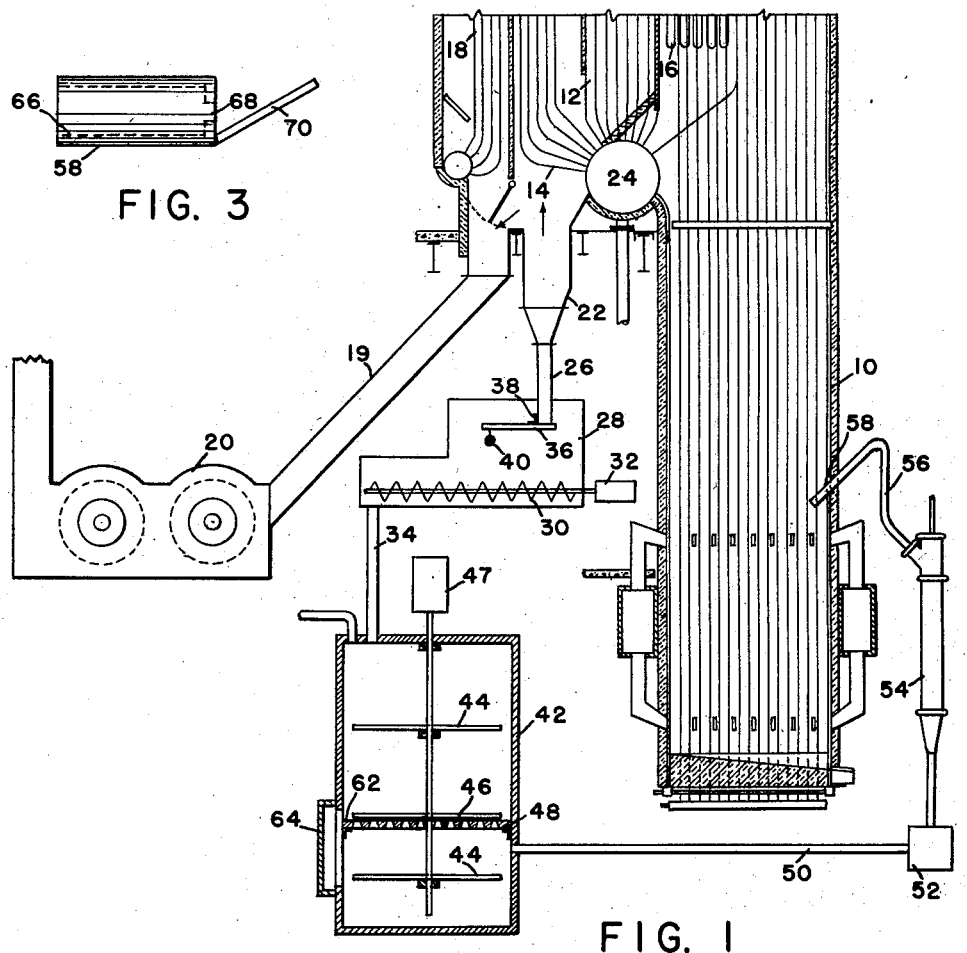
FIG. 3
FIG. 1
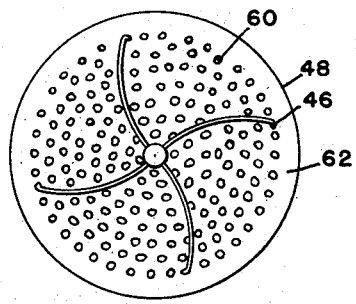
FIG. 2
*INVENTOR.*
HAROLD MOXNESS
BY
*H.F. Woodward*
atty

United States Patent Office 2,891,843
Patented June 23, 1959

2,891,843

CHEMICAL RECOVERY PROCESS AND APPARATUS

Harold J. Moxness, International Falls, Minn., assignor to Minnesota and Ontario Paper Company, Minneapolis, Minn.

Application February 9, 1953, Serial No. 335,645

4 Claims. (Cl. 23—48)

This invention relates to chemical recovery system for the process of pulp manufacture for paper mills and the like and particularly to an improvement in salt cake mixing tank and salt cake receiving containers.

In the recovery of chemicals from a pulp residual process liquid containing inorganic chemicals and combustible organic matter, such as, for example, the black liquor of the sulfate process of manufacturing of paper pulp. The liquor is concentrated by evaporation to a solid concentration to about 45 to 70% and its combustible constituents burned in a furnace to recover the included inorganic chemicals and to generate heat for absorption in an associated heat exchanger apparatus.

Briefly, the system ordinarily employed comprising a smelter furnace from which the products of combustible pass through a waste heat boiler and then through an evaporator. The black liquor from the digestion of wood pulp is reduced to the desired density or concentration of solids and is then sprayed into the furnace wherein it is evaporated while in suspension to dryness sufficient to sustain combustibility of the combustible matter in the chemicals deposited on the walls of the furnace and falling upon the hearth. Due to the heat of combustion on the hearth, reduction of chemicals takes place and the reduced chemicals run from the furnace in a molten state. The chemicals are then converted to so called white liquor and re-used as a solvent for the pulp in the digester.

The products of combustion arising from the hearth into the furnace furnish the heat for evaporation of the sprayed-in black liquor. Some of the black liquor is carried upwardly through the boiler and thence into the evaporator where it is re-claimed in a bath of black liquor. In the evaporator the previously concentrated black liquor is brought up to a suitable density and is then conducted to a salt cake mixing tank wherein additional salt cake is added to the liquor. From the salt cake tank the liquor is pumped through to a nozzle by which it is sprayed into the furnace.

The passage of the liquor and salt cake through salt cake tank and the feeding of the liquor from the salt cake tank to the furnace has presented great difficulty in such a system. Fly ash and precipitated chemicals, removed from the stack gases, and salt cake are fed to a container from where they are discharged into a tank by means such as a screw conveyor. Black liquor is simultaneously fed into the tank along with the materials from the container. The hot (about 170° to 190° F.) black liquor dissolves the salt cake but often particles of salt cake are not properly dissolved and result in clogging of the screen in the tank and the spray nozzle.

It is an object of this invention to provide means for overcoming and eliminating these difficulties.

A preferred form of the apparatus for carrying out the invention is illustrated in the accompanying drawings, where:

Figure 1 is a diagrammatical illustration of a recovery system partly in side elevation and partly in section;

Figure 2 is an enlarged view of the foraminous plate in the salt cake tank; and

Figure 3 is a side view of the spray nozzle.

It is to be understood that any suitable furnace may be used such as shown in Tomlinson and Wilcoxson Patent No. 2,179,456; Tomlinson et al. No. 2,590,905; or Hamm No. 2,319,399. The combustion in the furnace occurs preferably in the presence of heat absorbing surfaces such as water cooled tubes forming a part of the steam generators. The recovery units are self-sustaining, that is to say a commensurate amount of heat is required to be carried into the furnace by the black liquor to compensate for the heat carried up to the absorbing surfaces and the heat required for successful drying and burning of the combustible constituents on the hearth.

The sulphidity of the white liquor is varied by varying the amount of salt cake added to the black liquor in the salt cake mixer prior to its entry into the furnace. This added charge changes the general performance of the so-called "ash" on the hearth. The concentrated black liquor, after having been heated to a predetermined temperature, is sprayed under pressure into the space in the furnace where it is dried and partially volatilized by the heat from the burning combustible constituents in the liquor. Part of the combustion occurs in the space but the larger part takes place on the hearth in the bottom of the furnace into which the sufficiently dried portions of the sprayed liquor falls as so-called "ash."

Referring to Figure 1 numeral 10 denotes a furnace in the bottom of which is a smelting zone. This furnace is lined with exposed tubular water walls forming a part of the waste heat boiler and is preferably of considerable height. Above and to one side of the furnace is the boiler proper. It has upright tubes 12 and 14 baffled so that the gas stream from the boiler furnace chamber passes into the upper portion of the first bank and then downwardly over the bank of tubes 12 and across the lower portion thereof and upwardly over the bank of tubes 14. Immediately in advance of the first bank of tubes is a super heater 16 shielded by a row of boiler tubes. To the rear of bank of tube 14 is a down pass in which a bank of tubes 18 is located. The waste gases leaving the boiler enter the evaporator 20 by conduit 19 and are eventually discharged into a duct to the stack (not shown). The hopper 22 is located immediately to the rear and below the mud drum 24 and communicates with the lower portion of passes containing tubes 12 and 14 of the boiler.

The black liquor after having been concentrated to a desired density in evaporators (not shown) is introduced into evaporator 20 from which it is delivered to the salt cake mixing tank 42 by means now shown. In the mixing tank 42 the black liquor is mixed with salt cake, delivered from the container 28 by conveyor 30 and passage 34. The container 28 receives fly ash and precipitates chemicals from stack gases and salt cake by suitable means (not shown). The conveyor 30 is operated by variable speed controllable motor 32. The mixing tank 42 is provided with stirring devices as paddles 44 and 46 and is driven by a suitable motor 47. The black liquor from the tank 42 is then pumped to the furnace through pipe 50 by means of a pump 52 through pre-heater 54, pipe 56 and spray nozzle 58. The dense liquor is sprayed into the furnace by nozzle 58 where the spray encounters the ascending flame stream. The particles in gravitating to the hearth are dried and collected thereon in a bed. Air is admitted through a bed in an amount sufficient to maintain reducing atmosphere. Reduction of the chemical takes place and it runs in molten form from the hearth. The solid carbonaceous matter in the dried particles is burned. The combustibles in the gas arising from the bed encounter an oxidizing atmosphere and are burned. For this purpose additional air is admitted.

Chemicals are, of course, present in the rising flame and gas stream in the form vapor. This vapor is condensed by the absorption of heat by the stream generating and other surfaces of the boiler unit of the installation. It condenses largely in the form of dust, and due to the reversal direction of the waste gas stream from passes containing tubes 12 and 14 and dust separate out and settles out into the hopper 22. Such particles as deposited on the boiler tubes and other parts are from time to time removed therefrom by suitable means. The particles settling in hopper 22 pass through conduit 26 to container 28. To prevent cold air from passing through hopper 22 and cooling the furnace, member 36 is hingedly mounted at 38 and closing the open end of conduit 26. The member 36 is provided with adjustable weight 40 to contral the opening and closing of the member 36. When a predetermined amount of dust is deposited upon member 36 which closes the end of conduit 26, the dust is discharged into container 28. Salt cake from container 28 as hereinbefore indicated passes through pipe 34 and into the salt cake tank 42. Positioned in the salt cake tank 42 above the bottom is a divisional plate 48 which is in the form of a foraminous member. The holes in the plate 48 being of a size which is slightly greater than about one-half of the size of the opening in the spray nozzle 58. This insures that the nozzle 58 will not be clogged from salt cake not properly dissolved or by foreign material. The blade 46 which is positioned relatively close to member 48 is preferably curved and with this arrangement any foreign material or salt cake which is not properly dissolved will be pushed out past the end of the blades 46 and may be removed from time to time. The openings 60 in plate 48 have their smallest diameter at the upper surface and increase in diameter for the thickness of the plate 48. One set of blades or paddles 44 are positioned on the upper part of tank 42 and spaced apart from blades or paddles 46. Located in the lower portion of the tank 42 are blades 44.

The plate 48 has a solid non-perforated area 62 and the blades 46 do not extend thereover, so that material collected on the area 62 may be removed. A clean out means 64 is provided. The black liquor is withdrawn from the tank 42 at a point spaced above the bottom of the tank, this will insure any sludge, etc., that is in the liquor will settle to the bottom of the tank and can be removed from time to time.

The nozzle is provided with passage 66, spray opening 68, and plate 70. The plate 70 insures that the liquor entering the furnace will be distributed across the width of the furnace.

What is claimed:

1. In a continuous smelting process of recovering chemicals from black liquor derived in wood pulp mills from digesting cellulosic material in which the black liquor is concentrated and then substantially continuously forced through a spray nozzle having an opening into a furnace for combustion of the combustible constituents thereof and withdrawing chemicals carried by the combustible gases and in which a salt cake and chemicals withdrawn from the furnace gases are substantially continuously introduced into black liquor prior to its introduction into the furnace and in which the chemicals are recovered as a smelt in a furnace and the smelt is treated to obtain liquor to be used in the digesting of further cellulosic material; the steps simultaneously feeding chemicals withdrawn from the furnace, salt cake and black liquor in a tank divided by a foraminous member into an upper and lower compartment; agitating the black liquor containing the salt cake in the upper compartment; controlling the size of the salt cake particles in the black liquor by forcing them through the foraminous member containing foramina of increasing diameter, the smallest foramina diameter of a size which is greater than about one-half the diameter but less than the diameter of the spray nozzle opening through which the black liquor is sprayed into the furnace; agitating the black liquor containing the controlled particle size of the salt cake in the lower compartment; withdrawing the black liquor containing the salt cake particles from the lower container at a point above the bottom therefor; and then forcing the black liquor through said spray nozzle opening.

2. In a system of recovering chemicals from black liquor from a wood pulping operation, the combination of a spray nozzle having an opening therein and a salt cake tank for receiving salt cake and black liquor, a foraminous member positioned in the salt cake tank dividing the tank into an upper and lower compartment, said foraminous member having an upper and lower surface with foramina therein of increasing diameter from the upper surface to the lower surface, each foramina smallest diameter of a size greater than about one-half the size of the spray nozzle opening but less size than the diameter of the spray nozzle, curved blades positioned adjacent the upper surface of the foraminous member, agitating means positioned in the upper compartment of the salt cake tank, agitating means positioned in the lower compartment of the salt cake tank and means for withdrawing black liquor containing the salt cake from the lower compartment and above the bottom thereof and forcing it through the spray nozzle opening.

3. A system in accordance with claim 2 in which the foraminous member has a non-apertured portion around the outer edge.

4. A system as set forth in claim 2 in which curved blades and the agitating means are mounted on a common shaft.

References Cited in the file of this patent

UNITED STATES PATENTS

| | | |
|---|---|---|
| 205,560 | Kistler | July 2, 1878 |
| 1,111,788 | Ewing | Sept. 29, 1914 |
| 1,220,232 | Jackson | Mar. 27, 1917 |
| 1,358,920 | Baldwin | Nov. 16, 1920 |
| 1,463,279 | Arnold et al. | July 31, 1923 |
| 1,842,066 | Boyer | Jan. 19, 1932 |
| 1,898,479 | Coghlan et al. | Feb. 21, 1933 |
| 2,230,799 | Hobbs | Feb. 4, 1941 |
| 2,495,248 | Gagliardi et al. | Jan. 24, 1950 |
| 2,555,337 | Hamm | June 5, 1951 |
| 2,583,145 | Hochmuth | Jan 22, 1952 |
| 2,593,503 | Tomlinson et al. | Apr. 22, 1952 |
| 2,672,075 | Fraser | Mar. 16, 1954 |